March 22, 1927.  E. WILDHABER  1,622,014

METHOD OF PRODUCING GEARS

Filed Feb. 23, 1926

INVENTOR
Ernest Wildhaber
BY
ATTORNEY

Patented Mar. 22, 1927.

1,622,014

UNITED STATES PATENT OFFICE.

ERNEST WILDHABER, OF ROCHESTER, NEW YORK, ASSIGNOR TO GLEASON WORKS, OF ROCHESTER, NEW YORK, A CORPORATION OF NEW YORK.

METHOD OF PRODUCING GEARS.

Application filed February 23, 1926. Serial No. 90,056.

The present invention relates to a method of producing gears and particularly to a method of producing curved tooth bevel or hypoid gear pairs in which one member is non-generated.

One object of this invention is to provide a method for producing a non-generated gear in which the roughing and finishing cuts may be effected in a single cutting operation, whereby such gears may be quickly and inexpensively manufactured.

A further object of this invention is to provide a method for producing a non-generated gear in which the teeth will be provided with smooth side surfaces.

A further object of this invention is to provide a method for producing pairs of curved tooth gears which will be more rapid than methods heretofore employed and in which the gears produced will have desirable tooth characteristics.

Other objects of the invention will be apparent hereinafter from the specification and from the recital of the appended claims.

Heretofore, standard curved tooth gears have been manufactured by cutting tooth side after tooth side, one side only being cut at a time, or by cutting two adjacent sides of one member of the pair simultaneously, and cutting the other member one side at a time. The gain in production time of the latter method is effected only with a certain sacrifice in the tooth shape, the teeth of one member of the pair being tapered only to a small extent, longitudinally, while the required tooth taper is placed mainly on the teeth of the other member. The present invention provides a method for cutting both members of a pair which is more rapid than the last mentioned process and at the same time permits of making the teeth of both gears tapered. This result is achieved by cutting the gear or wheel in a non-generated operation by a new process in which two adjacent tooth sides are cut while the tool is kept in a tooth space, and by cutting the pinion "spread blade" or two sides simultaneously. The new method of cutting the gear or wheel permits of producing teeth on this member which taper longitudinally, while the tooth taper heretofore usually applied to the teeth of the gear, may be applied to the pinion so that now both members can be provided with longitudinally tapering teeth. Because the gear is non-generated, its cutting time will be no greater with my new method than in the usual "spread blade" process of generating which requires a roll. The present invention hence enables the production of a pair of gears with improved tooth structure in a production period which is less than in processes heretofore employed.

The present invention, moreover, permits of roughing out and finishing the teeth of the gear or wheel in a single operation.

In producing the gear or wheel according to this invention, the tool is first fed to depth, which constitutes the roughing cut. The cutter is then fed in a direction at an angle to its axis, preferably at a right angle, for a short distance. In the final position, one tooth side of the blank will be finished. The tool is then fed back while remaining at full depth, past the roughing position to another position in which the adjacent tooth face is finish cut. The cutter is then withdrawn relatively to the blank to permit indexing of the blank. This series of operations proceeds with each tooth space until all the teeth of the blank have been cut. The present invention, therefore, provides a method for roughing a tooth space and finishing two adjacent tooth sides successively before indexing. The combination of the roughing and finishing cuts enables rapid production, while the cutting of the tooth sides successively instead of simultaneously permits of securing a smooth tooth surface finish.

A preferred embodiment of the invention is illustrated diagrammatically in the accompanying drawings.

Figure 1:
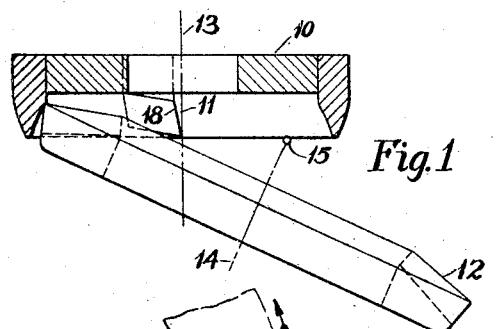
Fig. 1 is a side elevation, partly in section, showing a tool in engagement with the gear or wheel blank.
Figure 2:
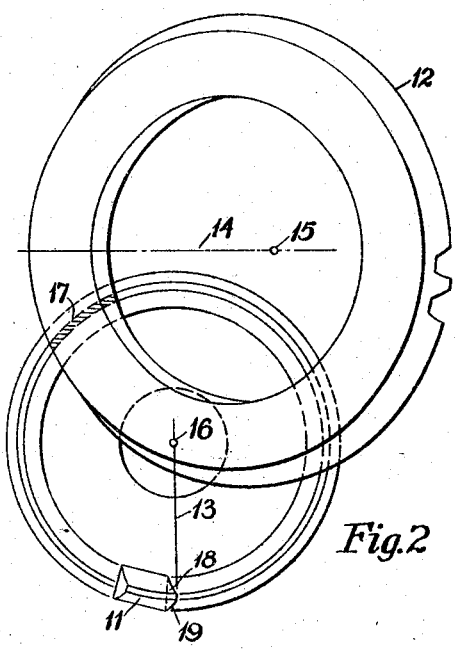
Figs. 2, 3 and 4 are plan views illustrating diagrammatically successive positions of tool and blank in cutting a gear or wheel according to this invention.

Referring to the drawing by numerals of reference and first particularly to Figs. 1-4, 10 indicates a rotary face mill provided with a plurality of cutting blades 11. In producing the gear or wheel, the tool 10 is fed relatively to the blank 12, while being continuously rotated on its axis 13, until proper tooth depth has been reached. This position is shown in Fig. 1. During the depth feed movement of the tool, the blank whose apex is at 15 is held stationary on its axis 14. The depth feed movement of the tool will be preferably in the direction of its axis 13. The depth feed movement constitutes the roughing operation and when it is completed, the blank will be provided with a groove or slot which is complementary to the cutter. This is indicated in Fig. 2 in which the rough cut is indicated by a shaded portion 17. For the sake of clearness only the surface swept out by the tip of the tool is shown. It will be understood, however, that the slot at the pitch surface and at the top surface will also be complementary to the cutter.

Figure 3:
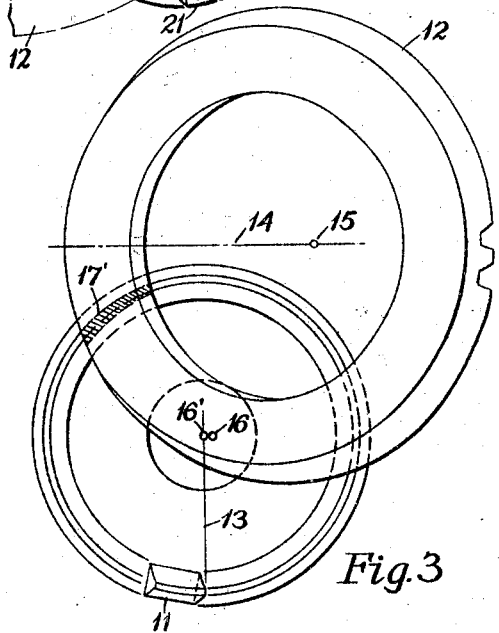
Figure 4:
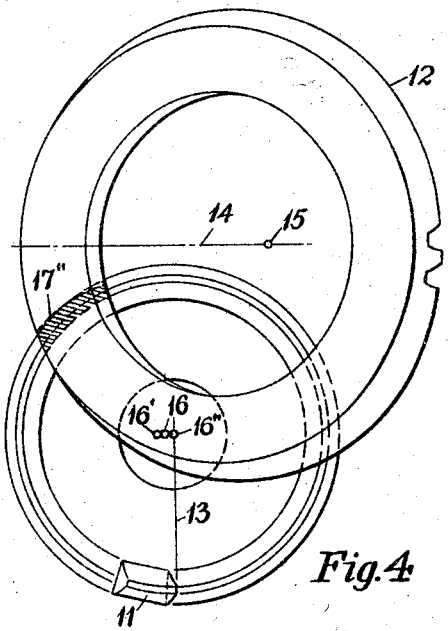

The cutter is then fed horizontally in a direction preferably at right angles to its axis from the position indicated by the point 16 in Fig. 2 to the position 16' in Fig. 3. When the position 16' is reached one side face of a tooth of the blank will have been completed. The cutter is then again fed horizontally along the same line back past its initial position 16 to a position 16'' where the adjacent side face of the blank will be finish cut. During each of these horizontal feed movements, it will be understood, the tool is rotating and is maintained at full depth. The surface cut by the tip of the tool after each of its horizontal feed movements is shown in Figs. 3 and 4 at 17' and 17''. It will be seen that the described horizontal feed movements provide the necessary lengthwise taper of the tooth space as well as proper width thereof.

Preferably the tool will be provided with cutting blades each of which has an outside finish cutting edge and an inside finish cutting edge. Each blade then cuts both on the outside and inside. A tool of this sort is shown in the drawing. Each blade 11 of the tool is preferably provided with a front rake of about 12° to 15° so that the cutting edges 18 and 19 are in a plane which is inclined, that is, non-radial to the cutter axis 13.

After the two adjacent tooth faces have been cut, the tool will preferably be fed back to its roughing position 16 and then withdrawn from engagement with the blank to permit of indexing the blank to the next tooth space. The cutting operation for each tooth space will proceed in the manner already described until the gear has been finished. Because no generating roll is required, this method of cutting the gear will be substantially as rapid as that employed heretofore in producing generated gears "spread blade".

While in the above description, feed movements of the tool only have been described, it will be understood that instead of feeding the tool relative to the blank, the blank may be fed relative to the tool or any other desired relative feed movement imparted between tool and blank.

Figure 5:
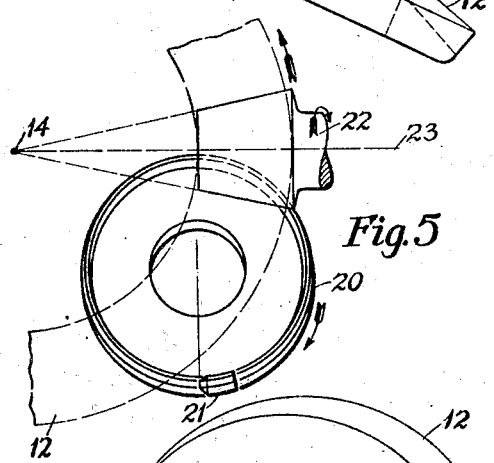
Fig. 5 is a view illustrating diagrammatically the preferred method of producing the pinion.

The mating gear or pinion will be cut in a generating operation and will preferably be cut "spread blade" or two side faces simultaneously. The method of cutting this member is illustrated in Fig. 5. 20 indicates the tool employed, preferably a rotary annular face mill provided with cutting blades 21 which have cutting edges which are adapted to finish cut two adjacent side faces of the blank simultaneously. In cutting the pinion, the cutter is rotated on its axis in engagement with the blank 22 and simultaneously therewith a relative rolling motion is imparted between tool and blank as though the blank were rolling on its mate gear 12. This relative rolling motion may consist, as indicated, of a rotation of the blank on its axis 23 and a simultaneous relative translation of tool and blank about the axis 14 of the mate gear 12. After the sides of one tooth space of the pinion have been cut, the blank is indexed and the operation proceeds as before. In producing bevel pinions the blank will be positioned so that its apex coincides with the apex of the mate gear, while in manufacturing hypoid pinions, the blank will be positioned with its axis offset from the apex of the mate gear.

Instead of using in cutting the pinion, a tool of the form shown, each of whose cutting blades is provided with two side finish cutting edges, a tool may be employed, whose cutting blades are arranged in pairs alternate blades finish cutting opposite tooth sides. The combination of the method described for producing the gear according to this invention with a "spread blade" process in manufacturing the pinion permits of very rapid production of the gear pairs. The term "spread blade" is employed in the art to designate the process of cutting curved tooth gears in which two adjacent side faces of the teeth of the blank are cut simultaneously. Usually this process is carried out with a rotary annular tool having a plurality of cutting blades so constructed and so arranged that successive blades finish cut adjacent side tooth faces of the blank.

While I have described my invention in connection with a specific embodiment, it is to be understood that the invention is capable of further modification within its scope or the limits of the appended claims and that this application is intended to cover any adaptations or embodiments following, in general, the principles of the invention and including such departures from the present disclosure as come within known or customary practise in the gear art and as may be applied to the essential features hereinbefore set forth and as fall within the scope of the invention or the limits of the appended claims.

Having thus described my invention, what I claim is:

1. The method of producing a gear which consists in rotating a tool, having annularly arranged cutting portions, in engagement with a gear blank to finish cut one side face of a tooth of the blank, then shifting the tool relative to the blank, in a direction at an angle to the tool axis, to finish cut the adjacent tooth face of the blank, then indexing the blank, and repeating these operations until all the teeth have been cut on the blank.

2. The method of producing a gear which consists in rotating a tool, having annularly arranged cutting portions, in engagement with a gear blank to finish cut one side tooth face of the blank, then shifting the tool relative to the blank in a direction at right angles to the tool axis, to finish cut the adjacent tooth face of the blank, then indexing the blank, and repeating these operations until all the teeth have been cut on the blank.

3. The method of producing a gear which consists in rotating a tool, having annularly arranged cutting portions, in engagement with a stationary gear blank to finish cut one side tooth face of the blank, then shifting the relative positions of tool and blank at right angles to the tool axis, while continuing to rotate the tool, to finish cut the adjacent tooth face of the blank, then indexing the blank and repeating these operations until all the teeth have been cut on the blank.

4. The method of producing a gear which consists in rotating a tool, provided with a plurality of annularly arranged cutting blades each of which has an outside finish cutting edge and an inside finish cutting edge, in engagement with a stationary gear blank and simultaneously shifting the tool and blank relatively to each other to successfully cut adjacent tooth faces of the blank.

5. The method of producing a gear which consists in rotating a tool, having a plurality of annularly arranged cutting portions each of which has an outside finish cutting edge and an inside finish cutting edge, in engagement with a stationary gear blank and simultaneously shifting the tool and blank relatively to each other in a direction at right angles to the tool axis to successively cut adjacent tooth faces of the blank.

6. The method of producing a non-generated gear which consists in feeding a rotating tool having annularly arranged cutting portions, and a gear blank relatively to each other until proper tooth depth has been reached, then shifting the tool and blank relatively to each other to finish cut one tooth side of the blank, again shifting the tool and blank relatively to each other to finish cut an adjacent tooth side, withdrawing the tool and blank relatively to each other to index and repeating these operations until all the teeth have been cut.

7. The method of producing a non-generated gear which consists in feeding a rotating tool, having annularly arranged cutting portions, and a gear blank relatively to each other until proper tooth depth has been reached, then shifting the tool and blank relatively to each other in a direction at right angles to the tool axis to finish cut one tooth side of the blank, again shifting tool and blank relatively to each other in a direction at right angles to the tool axis to finish cut an adjacent tooth side of the blank, withdrawing the tool and blank relatively to each other to index and repeating these operations until all the teeth have been cut.

8. The method of producing a non-generated gear which consists in feeding a rotating tool, provided with a plurality of annularly arranged cutting portions each of which has an outside finish cutting edge and an inside finish cutting edge, and a gear blank relatively to each other until proper tooth depth has been reached, then shifting the tool and blank relatively to each other to finish cut one tooth side of the blank, again shifting tool and blank relatively to each other to finish cut an adjacent tooth side of the blank, withdrawing the tool and blank relatively to each other to index and repeating these operations until all the teeth have been cut.

9. The method of producing a non-generated gear which consists in feeding a rotating tool, provided with a plurality of annularly arranged cutting portions each of which has an outside finish cutting edge and an inside finish cutting edge, and a gear blank relatively to each other until proper tooth depth has been reached, then shifting the tool and blank relatively to each other in a direction at right angles to the tool axis to finish cut one side tooth face of the blank, again shifting tool and blank relatively to each other in a direction at right angles to the tool axis to finish cut an adjacent tooth face of the blank, withdrawing the tool and blank relatively to each other to index and repeating these operations until all the teeth have been cut.

10. The method of producing a non-generated gear which consists in feeding a rotating tool, provided with a plurality of annularly arranged cutting portions, and a gear blank relatively to each other until proper tooth depth has been reached, then shifting the tool and blank relatively to each other along a straight line in one direction to finish cut one side tooth face of the blank, again shifting the tool and blank relatively to each other along the same straight line but in an opposite direction to finish cut an adjacent tooth face of the blank, withdrawing the tool and blank relatively to each other to index and repeating these operations until all the teeth have been cut.

11. The method of producing a non-generated gear which consists in moving a tool in a curved path across the face of the blank and simultaneously shifting the relative position of tool and blank to successively cut adjacent tooth faces of the blank, indexing the blank and repeating these operations until all the teeth have been cut.

12. The method of producing a pair of longitudinally curved tooth gears which consists in forming one member of the pair by successively reproducing the cutting surfaces of a rotary annular cutting tool on the sides of each tooth space of said gear while the tool is rotating in each tooth space and in producing the other member of the pair by simultaneously cutting adjacent tooth sides of a gear blank while imparting a relative rolling movement between the tool employed and the blank in the manner of a gear rolling on its mate gear.

13. The method of producing a pair of longitudinally curved tooth gears which consists in forming one member of the pair by successively reproducing the cutting surfaces of a rotary annular cutting tool on the sides of each tooth space of said gear, in such a way that the axes of said surfaces are parallel, while the tool is rotating in each tooth space, and in producing the other member of the pair by simultaneously cutting adjacent tooth sides of a gear blank while imparting a relative rolling movement between the tool employed and the blank in the manner of a gear rolling on its mate gear.

14. The method of producing a gear which consists in feeding a rotating tool, provided with a plurality of annularly arranged cutting portions, and a gear blank relatively to each other until proper tooth depth has been reached, then shifting the tool relative to the blank in a direction at an angle to the tool axis to finish cut one side tooth face of the blank, again shifting the tool relative to the blank in a direction at an angle to the tool axis to finish cut an adjacent tooth side of the blank, withdrawing the tool and blank relatively to each other to index and repeating these operations until all the teeth have been cut.

15. The method of producing a gear which consists in feeding a rotating tool, provided with a plurality of annularly arranged cutting portions, and a gear blank relatively to each other until proper tooth depth has been reached, then shifting the tool relative to the blank in a direction at right angles to the tool axis to finish cut one side tooth face of the blank, again shifting the tool relative to the blank in a direction at right angles to the tool axis to finish cut an adjacent tooth side of the blank, withdrawing the tool and blank relatively to each other to index and repeating these operations until all the teeth have been cut.

16. The method of producing a gear which consists in feeding a rotating tool, provided with a plurality of annularly arranged cutting portions, and a gear blank relatively to each other until proper tooth depth has been reached, then shifting the tool and blank relatively to each other along a straight line in one direction to finish cut one side tooth face of the blank, again shifting the tool and blank relatively to each other along the same straight line but in an opposite direction to finish cut an adjacent tooth face of the blank, withdrawing the tool and blank relatively to each other to index and repeating these operations until all the teeth have been cut.

ERNEST WILDHABER.